United States Patent
Ohishi et al.

(10) Patent No.: US 10,911,925 B2
(45) Date of Patent: Feb. 2, 2021

(54) ALERT DISTRIBUTION DEVICE, ALERT DISTRIBUTION METHOD, AND RECORDING MEDIUM

(71) Applicant: NEC Corporation, Tokyo (JP)

(72) Inventors: Hironori Ohishi, Tokyo (JP); Tatsuhiko Ikeda, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/607,289

(22) PCT Filed: Apr. 18, 2018

(86) PCT No.: PCT/JP2018/015938
§ 371 (c)(1),
(2) Date: Oct. 22, 2019

(87) PCT Pub. No.: WO2018/198892
PCT Pub. Date: Nov. 1, 2018

(65) Prior Publication Data
US 2020/0382935 A1 Dec. 3, 2020

(30) Foreign Application Priority Data
Apr. 26, 2017 (JP) .................. 2017-087657

(51) Int. Cl.
H04W 4/90 (2018.01)
H04W 4/06 (2009.01)

(52) U.S. Cl.
CPC .............. *H04W 4/90* (2018.02); *H04W 4/06* (2013.01)

(58) Field of Classification Search
CPC .................... H04W 4/06; H04W 4/90
See application file for complete search history.

(56) References Cited

U.S. PATENT DOCUMENTS

| 8,315,590 B2* | 11/2012 | Hapsari | H04W 76/40 455/404.1 |
|---|---|---|---|
| 2009/0239498 A1* | 9/2009 | Lee | H04W 4/90 455/404.1 |
| 2010/0003945 A1* | 1/2010 | Primo | H04W 4/90 455/404.1 |

FOREIGN PATENT DOCUMENTS

| JP | 2009-159547 A | 7/2009 |
| JP | 2014-158229 A | 8/2014 |
| WO | 2007/039890 A1 | 4/2007 |

OTHER PUBLICATIONS

International Search Report for PCT/JP2018/015938 dated May 22, 2018 [PCT/ISA/210].

* cited by examiner

*Primary Examiner* — Raymond S Dean
(74) *Attorney, Agent, or Firm* — Sughrue Mion, PLLC (57) ABSTRACT

The purpose of the present invention is to provide, in the context of the operation of base station devices defined under 3GPP specifications, an alert distribution device that sends an alert to a device as appropriate on the basis of prescribed conditions, without the alert precedingly requested for distribution being overwritten by the alert succeedingly requested for distribution. To achieve this purpose, an assessment is made when distributing a new alert on whether to delay distributing the new alert on the basis of attributes of alerts distributed in the past, and if the assessment is in favor of delaying distribution, the new alert is distributed after a delay of a prescribed length to the base station device that sends new alerts to terminal devices in place of alerts requested for distribution in the past.

5 Claims, 6 Drawing Sheets

ALERT DISTRIBUTION DEVICE, ALERT DISTRIBUTION METHOD, AND RECORDING MEDIUM

CROSS REFERENCE TO RELATED APPLICATIONS

This application is a National Stage of International Application No. PCT/JP2018/015938 filed Apr. 18, 2018, claiming priority based on Japanese Patent Application No. 2017-087657 filed Apr. 26, 2017.

TECHNICAL FIELD

The present invention relates to an alert message distribution device, an alert message distribution method, and a recording medium.

BACKGROUND ART

In the Third Generation Partnership Project (3GPP) which is a standardization project, standard specifications for cellular network systems for distributing alert messages are established in specifications such as TS.22168 and TS.36.413. In TS.36.413 specification, it is stipulated that, when a base station device receives a different alert message, the base station device needs to overwrite the alert message that is being processed with the alert message subsequently received. A related technique is disclosed in PTL 1. The technique in PTL 1 is a technique for a communication device to give the highest priority to an alert message such as an earthquake alert.

CITATION LIST

Patent Literature

[PTL 1] Japanese Unexamined Patent Application Publication No. 2009-159547 A

SUMMARY OF INVENTION

Technical Problem

Distribution of an alert message as described above needs to be instantaneous. Therefore, when there is a succeeding alert message, the base station device overwrites the preceding alert message stored in the base station device with the succeeding alert message, thereby enhancing instantaneity in sending more recent information to the terminals. On the other hand, since various messages such as an emergency earthquake alert, disaster and evacuation information, and a tsunami warning are distributed nowadays, cases of almost simultaneous and continuous issue of alert messages may happen frequently. It is not always appropriate that the base station device overwrites an alert message for which a distribution request is made earlier upon receiving a distribution request for a succeeding alert message, because the preceding alert message may then fail to reach the terminal devices.

Therefore, an object of the present invention is to provide an alert message distribution device, an alert message distribution method, and a recording medium that solve the above-described problem.

Solution to Problem

The present invention is, as a first aspect, an alert message distribution device, the alert message distribution device includes:

a distribution delay determination unit that, when distributing a new alert message, determines whether to delay distribution of the new alert message based on attributes of a previous alert message distributed in past; and an alert message sending unit that, when it is determined that the distribution is delayed, distributes the new alert message to a base station device after waiting for a designated delay time, the base station device is a base station device to send the new alert message to a terminal device in place of the previous alert message for which a distribution request is made in past.

The present invention is, as a second aspect, an alert message distribution method, the alert message distribution method includes:

by an alert message distribution device, when distributing a new alert message, determining whether to delay distribution of the new alert message based on attributes of a previous alert message distributed in past; and when determining that the distribution is delayed, distributing the new alert message to a base station device after waiting for a designated delay time, the base station device being a base station device to send the new alert message to a terminal device in place of the previous alert message for which a distribution request is made in past.

The present invention is, as a third aspect, a computer-readable recording medium, the computer-readable recording medium records a program that causes a computer of an alert message distribution device to perform:

when distributing a new alert message, determining whether to delay distribution of the new alert message based on attributes of a previous alert message distributed in past; and when determining that the distribution is delayed, distributing the new alert message to a base station device after waiting for a designated delay time, the base station device being a base station device to send the new alert message to a terminal device in place of the previous alert message for which a distribution request is made in past.

Advantageous Effects of Invention

According to the present invention, with respect to an operation of a base station device stipulated in 3GPP specifications, it is possible to provide an alert message distribution device that, based on prescribed conditions, sends, to a terminal appropriately, an alert message necessary for a user who uses the terminal, without overwriting all undistributed alert messages with a succeeding alert message when alert messages for which distribution requests are made earlier are not yet distributed.

EXAMPLE EMBODIMENT

An alert distribution system including a distribution device according to an example embodiment of the present invention will be described below.

Figure 1:
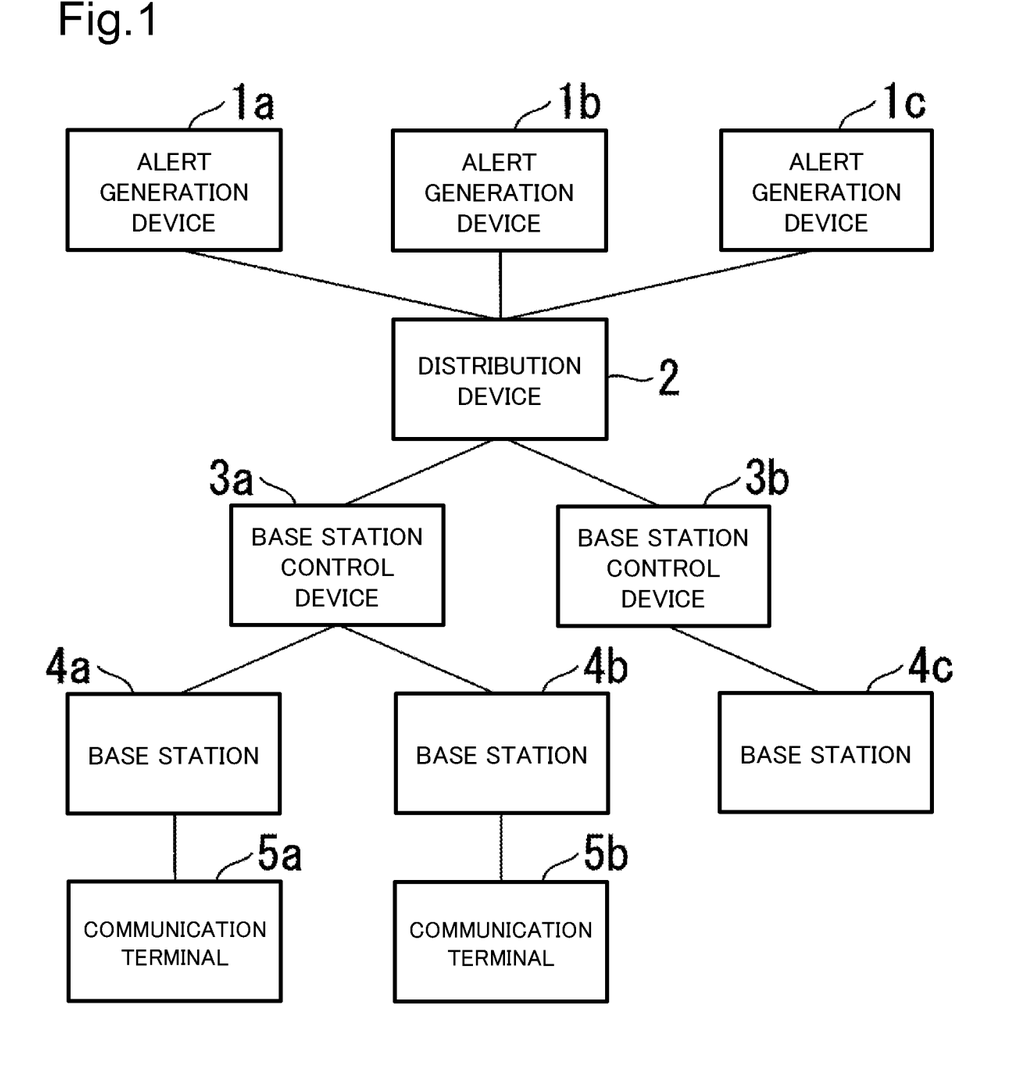
FIG. 1 is a diagram illustrating an example of an alert distribution system including a distribution device according to an example embodiment of the present invention.

FIG. 1 is a diagram illustrating an example of an alert distribution system including a distribution device.

As illustrated in this drawing, the alert distribution system includes alert generation devices 1 (la to ic), a distribution device 2, base station control devices 3 (3a and 3b), base station devices 4 (4a to 4c), communication terminals 5 (5a and 5b) connected with one another by communication.

In the alert distribution system illustrated in FIG. 1, the alert generation devices 1a to 1c are connected with the distribution device 2 by communication. The alert generation devices 1a to 1c generate alert messages. The distribution device 2 distributes the alert message that it has received to a base station device 4 that is to be the distribution destination among the base station devices 4a to 4c, based on the attributes of the alert message, via the base station control device 3a or 3b. Each of the base station control devices 3a, 3b is connected with one or more of the base station devices 4. In FIG. 1, the base station control device 3a is connected to the base station devices 4a, 4b while the base station control device 3b is connected with the base station device 4c. The communication terminal 5a is in the communication area of the base station device 4a and connected by communication. The communication terminal 5b is in the communication area of the base station device 4b and connected by communication. It is assumed that there is no communication terminal in the communication area of the base station device 4c.

In such an alert distribution system, the distribution device 2 analyzes the alert message that it has received and identifies the base station control device 3 and the base station device 4, to which the message is to be distributed. The distribution device 2 sends the alert message, addressing the alert message to the base station device 4 identified through the analysis of the alert message. The alert message is received by the base station control device 3 before being distributed to the base station device 4. The base station control device 3 identifies the base station device 4 to which the alert message is to be distributed based on the information in the alert message and sends the alert message to the base station device 4. The base station device 4 determines the necessity or otherwise of notifying the communication terminal 5 based on the information in the alert message and, when the notification is necessary, the base station device 4 sends the alert message to the communication terminal 5.

Figure 2:
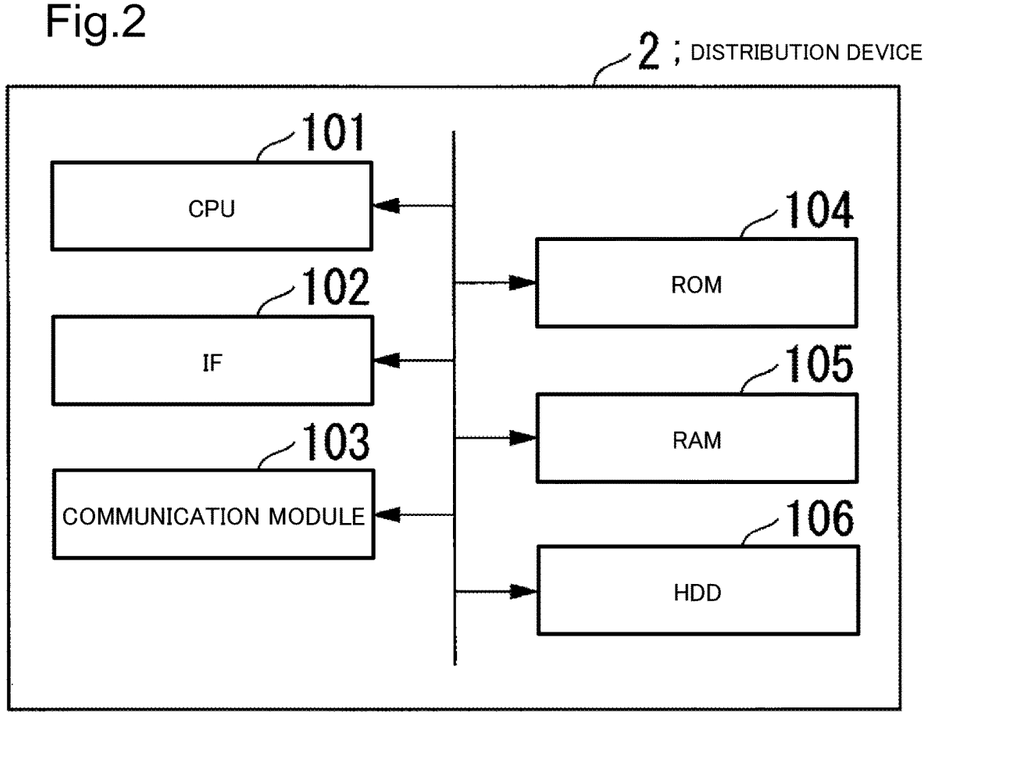
FIG. 2 is a diagram illustrating an example of a hardware configuration of the distribution device.

FIG. 2 is a diagram illustrating an example of a hardware configuration of the distribution device.

As illustrated in FIG. 2, the distribution device 2 includes a central processing unit (CPU) 101, an interface (IF) 102, a communication module 103, a read only memory (ROM) 104, a random access memory (RAM) 105, a hard disk drive (HDD) 106, and the like.

Note that the other devices are also computers having similar hardware configurations.

Figure 3:
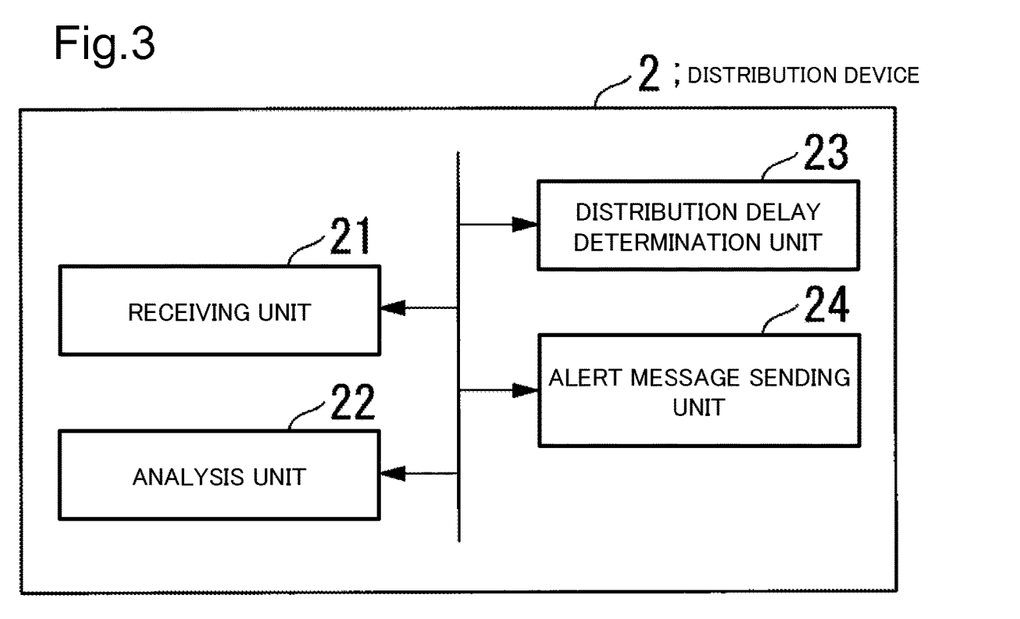
FIG. 3 is an example of a functional block diagram of the distribution device.

FIG. 3 is an example of a functional block diagram of the distribution device.

The distribution device 2 includes a receiving unit 21, an analysis unit 22, a distribution delay determination unit 23, and an alert message sending unit 24, these functions achieved by the CPU 101 executing a recorded program.

The receiving unit 21 receives the alert message.

The analysis unit 22 analyzes the alert message.

The distribution delay determination unit 23 determines, when distributing a succeeding alert message (new alert message), whether to delay the distribution of the succeeding alert message based on the attributes of a preceding alert message (previous alert message) distributed in the past.

When it is determined that the distribution will not be delayed, the alert message sending unit 24 distributes the alert message to the base station device 4 immediately. When it is determined that the distribution will be delayed, the alert message sending unit 24 distributes the new alert message after waiting for a designated delay time, addressing the new alert message to the base station device 4, which sends to a terminal device the succeeding alert message instead of the previous alert message for which a distribution request was made in the past. The alert message is distributed to the base station device 4 via the base station control device 3.

Figure 4:
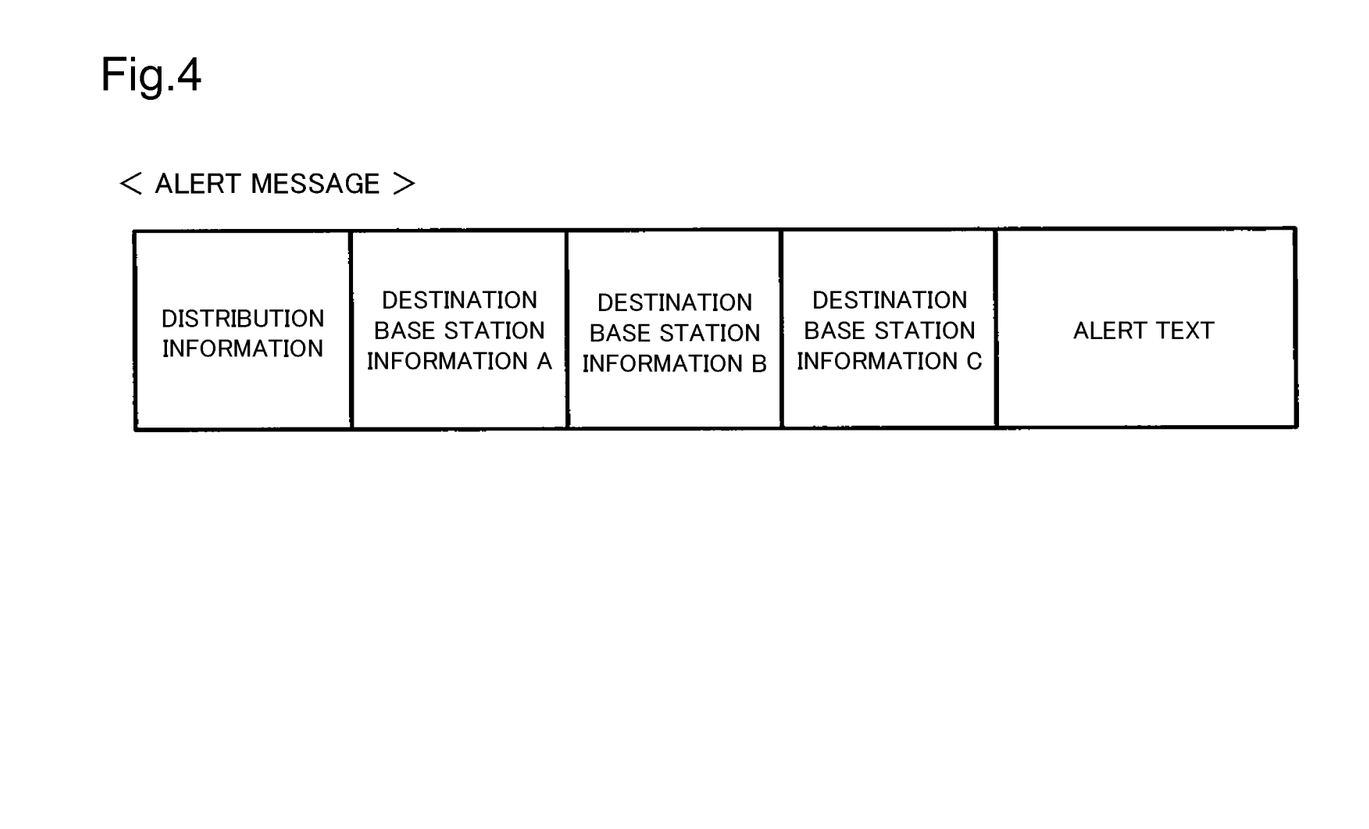
FIG. 4 is a diagram illustrating an example of data in an alert message.

FIG. 4 is a diagram illustrating an example of data in an alert message.

The alert message contains information such as distribution information, identification information of the destination base station device (destination base station information A, B, C in FIG. 4), and the alert text. The distribution information is information related to distribution such as the number of retransmissions. The alert text includes information that is to be displayed on the communication terminal. When the destination is more than one, the alert message contains identification information of a plurality of base station devices as illustrated in FIG. 4.

Figure 5:
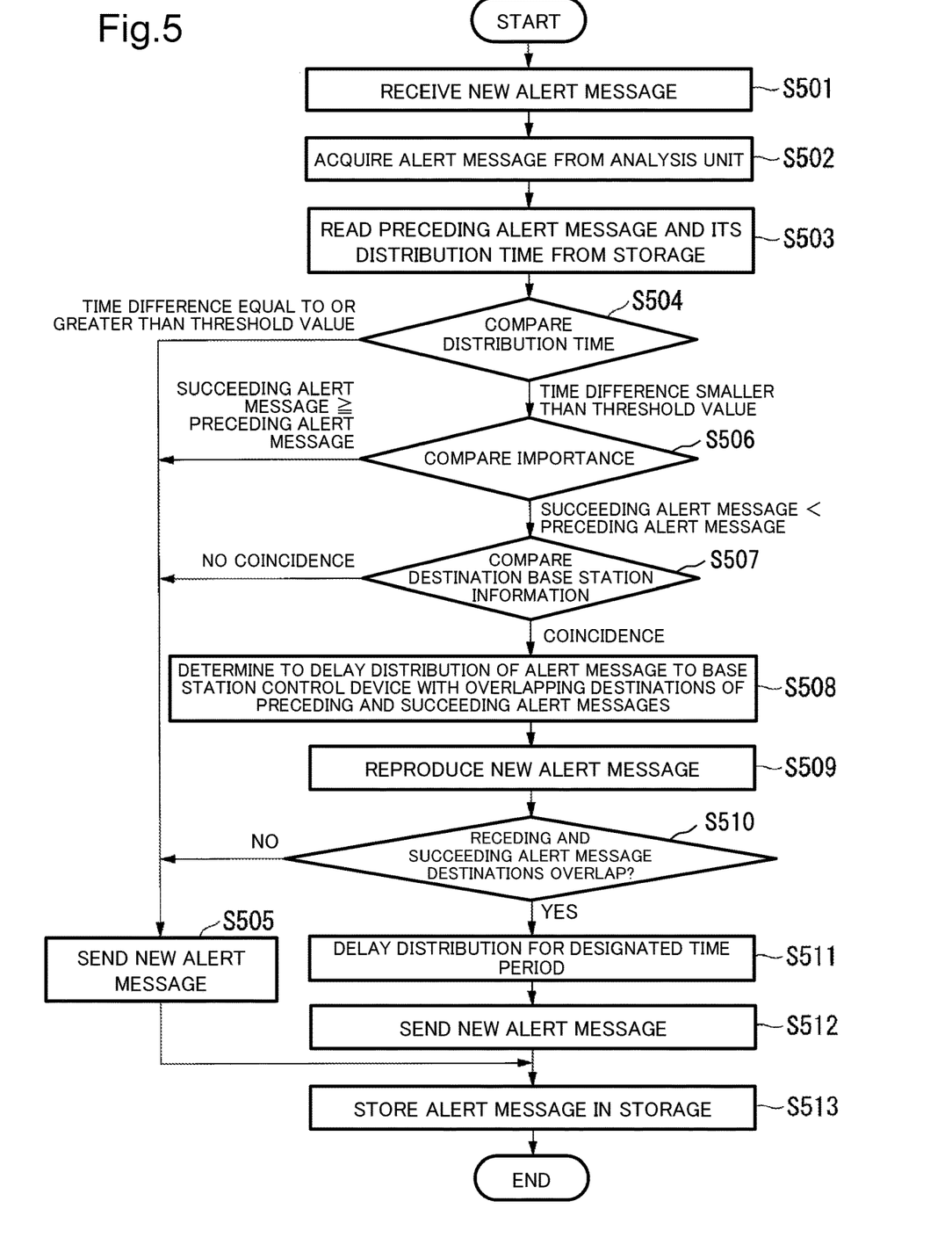
FIG. 5 is a flow chart of an example of processing by the distribution device.

FIG. 5 is a flow chart of an example of processing by the distribution device.

Details of processing by the distribution device 2 will be described step by step.

First, the alert message is generated by at least one of the alert generation devices 1 (la to 1c). The receiving unit 21 of the distribution device 2 receives the alert message sent by the alert generation device 1 (Step S501). The alert message is analyzed by the analysis unit 22. For example, the analysis unit 22 performs an analysis such as identifying the base station device 4 that is a distribution destination based on the distribution information contained in the alert message.

The distribution delay determination unit 23 acquires the alert message and the result of the analysis from the analysis unit 22 (Step S502). The distribution device 2 stores the preceding alert messages (previous alert messages) distributed in the past in a storage or the like. The distribution delay determination unit 23 reads from the storage such the preceding alert message and the distribution time that is one of the attributes of the preceding alert message (Step S503). The distribution delay determination unit 23 compares the distribution time of the preceding alert message and the present time (the distribution time of the succeeding alert message) (Step S504). The distribution delay determination unit 23 determines that the distribution will not be delayed when the time difference between the distribution time of the preceding alert message and the present time is equal to or greater than a designated threshold value. The alert message sending unit 24 then immediately sends the new alert message to the base station device 4 at the destination identified by the analysis unit 22 (Step S505).

Note that the comparison with the preceding alert message at Step S504 may be a comparison with an alert message distributed immediately before the succeeding alert message, or with a plurality of preceding alert messages including the one distributed immediately before, or even with all of one or more alert messages distributed before that. The designated threshold value, which is used by the distribution delay determination unit 23 in the above-described processing and is related to the time difference between the distribution time of the preceding alert message and the present time, may be a predetermined value or a value calculated based on the volume of the alert message per unit time distributed from the base station device 4.

When the distribution delay determination unit 23 detects a time difference smaller than the designated threshold value between the distribution time of the preceding alert message and the present time as the result of the comparison at Step S504, the distribution delay determination unit 23 reads the importance contained in the distribution information of the preceding alert message and the importance contained in the distribution information of the succeeding alert message and makes a comparison (Step S506). The distribution delay determination unit 23 determines that the distribution will not be delayed when the importance of the succeeding alert message is equal to or higher than the importance of the preceding alert message. The alert message sending unit 24 then immediately sends the preceding alert message to the base station device 4 at the destination identified by the analysis unit 22 (Step S505).

As such, when the importance of the succeeding alert message is equal to or higher than the importance of the preceding alert message, it is possible that the base station device 4 sends the succeeding alert message instead of the preceding alert message which is not yet distributed. However, when the importance of the succeeding alert message is equal to or higher than the importance of the preceding alert message, it is not problematic even if the preceding alert message is overwritten. On the other hand, when the importance of the succeeding alert message is lower than the importance of the preceding alert message, the processing to be described below is performed in order to prevent the alert message at the low importance from being distributed by the base station device 4 instead of the preceding alert message.

When the importance of the succeeding alert message is lower than the importance of the preceding alert message as the result of the comparison at Step S506, the distribution delay determination unit 23 reads the destination base station information contained in the distribution information of the preceding alert message and the destination base station information contained in the distribution information of the succeeding alert message and makes a comparison (Step S507). The distribution delay determination unit 23 determines that the distribution will not be delayed when the destination base station information contained in the distribution information of the preceding alert message and the destination base station information contained in the distribution information of the succeeding alert message do not coincide. The alert message sending unit 24 then immediately sends the new alert message to the base station device 4 at the destination identified by the analysis unit 22 (Step S505). When there is no overlap between the destinations of the preceding alert message and the destinations of the succeeding alert message, it will not be problematic because it is unlikely that the base station device 4 overwrites the preceding alert message and distributes the succeeding alert message. On the other hand, when the distribution destinations of the succeeding and the preceding alert messages coincide, the distribution delay determination unit 23 determines that the distribution of the succeeding alert message will be delayed (Step S508). The distribution delay determination unit 23 outputs to the alert message sending unit 24 the identification information of the base station devices 4 that are the destinations of both the preceding and the succeeding alert message.

When the identification information of the destination base station devices 4 of the succeeding alert message, which is one of the attributes of the succeeding alert message, overlaps the identification information of the destination base station devices 4 of the preceding alert message, which is one of the attributes of the preceding alert message, the alert message sending unit 24 reproduces the new alert message (Step S509).

Figure 6:
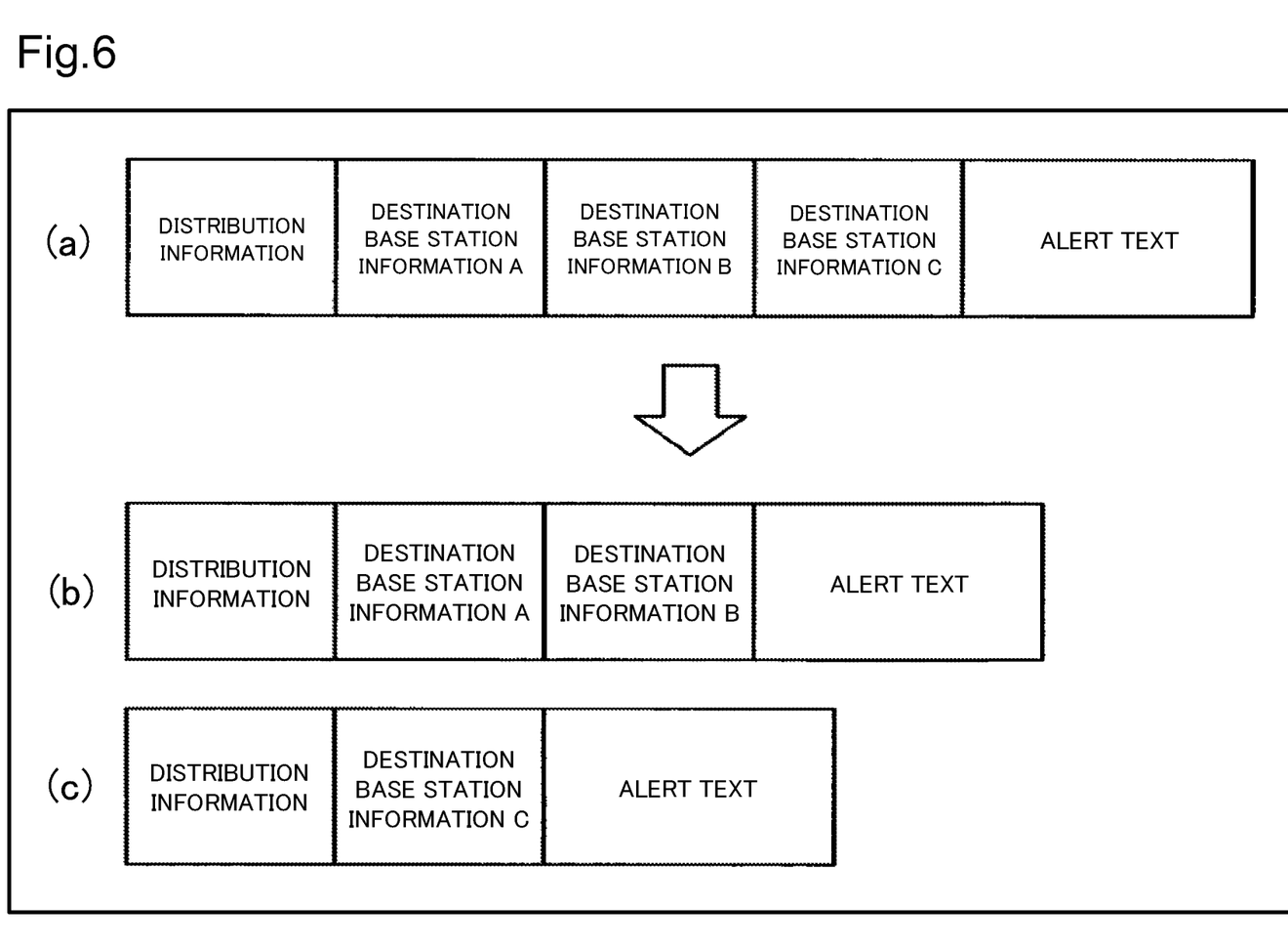
FIG. 6 is a diagram schematically illustrating an example of reproduction processing of an alert message.

FIG. 6 is a diagram schematically illustrating an example of reproduction processing of an alert message.

The alert message (a) illustrated in FIG. 6 is the same as the alert message illustrated in FIG. 4. The alert message sending unit 24 reproduces the alert messages (b), (c) illustrated in FIG. 6 from the alert message (a) illustrated in FIG. 6. It is assumed that the succeeding alert message (a) contains A, B, and C as information on the destination base station devices 4 as illustrated in FIG. 6 and that the preceding alert message and the succeeding alert message both contain A and B as destinations. In this case, the alert message sending unit 24 produces an alert message containing the overlapping destinations A and B (see the alert message (b) illustrated in FIG. 6) and an alert message containing only the non-overlapping destination C (see the alert message (c) illustrated in FIG. 6).

The alert message sending unit 24 then determines whether the alert message sending unit 24 is going to send the succeeding alert message to the destination base station device 4 that is different from the destinations of the preceding alert message (Step S510). When the alert message sending unit 24 is going to send the succeeding alert message to the destination base station device 4 that is different from the destinations of the preceding alert message, the alert message sending unit 24 sends the succeeding alert message (the alert message (c) illustrated in FIG. 6) to the base station device 4 immediately (Step S505). When the alert message sending unit 24 is going to send the succeeding alert message to the destination base station device 4 that overlaps the destinations of the preceding alert message, the alert message sending unit 24 delays the distribution of the succeeding alert message (the alert message (b) illustrated in FIG. 6) to the overlapping base station devices 4 identified based on the identification information acquired from the distribution delay determination unit 23, for a designated time period (Step S511). The designated time period may be equal to or longer than the time period required for the distributing processing at the destination base station devices 4 of the preceding alert message to ensure that the alert message has been distributed based on the distribution time of the preceding alert message. This designated time period may be set by the administrator.

After delaying the distribution for the designated time period, the alert message sending unit 24 sends the succeeding alert message (alert message (b) illustrated in FIG. 6) to the overlapping base station device 4 identified based on the identification information acquired from the distribution delay determination unit 23 (Step S512).

The alert message to be distributed to the base station device 4 is sent to the base station device 4 via the base station control device 3.

The processing at Step S511 and Step S512 delays the distribution of the alert message for the designated time period when a sufficient time has not expired since the sending of the preceding alert message, the importance of the succeeding alert message is lower than that of the preceding alert message, and the preceding and the succeeding alert messages are to be sent to the same base station device 4. Thus, the base station device 4 at the destination of the alert message is prevented from overwriting the preceding alert message with the succeeding alert message. When the alert message sending unit 24 completes the sending of the alert message, the alert message sending unit 24 stores the alert message in the storage (Step S513).

The above-described processing delays the distribution by the distribution device 2 of the succeeding alert message at a time when the time expired since the distribution time of the preceding alert message is less than the threshold value and it is possible that the distribution of the preceding alert message has not been completed at the base station device 4, in the case in which the importance of the succeeding alert message is lower than that of the preceding alert message and the destination base station device 4 of the preceding alert message overlaps that of the succeeding alert message. This prevents the base station device 4 from overwriting the preceding alert message at a higher importance with the succeeding alert message at a lower importance and distributing the succeeding alert message to the communication terminals 5.

Further, this enables the elimination of unnecessary delay in the distribution of the succeeding alert message when the time difference between the distribution time of the preceding alert message and the distribution time of the succeeding alert message is equal to or greater than the designated threshold value.

Further, this enables the elimination of unnecessary delay in the distribution of the succeeding alert message when the destination base station devices of the preceding alert message and the succeeding alert message do not overlap each other.

Three steps of comparison, Steps S504, S506, and S507 are performed in the above-described processing but, in another example embodiment, the comparison of the distribution times at Step S504 may be performed alone and it may be determined that the distribution will then be delayed in a similar manner to the processing at Step S508 when the time difference between the distribution times of the preceding and the succeeding alert messages is smaller than the threshold value.

In another example embodiment, the comparison of the importance at Step S506 may be performed alone and it may be determined that the distribution will then be delayed in a similar manner to the processing at Step S508 when the importance of the succeeding alert message is lower than the importance of the preceding alert message at Step S506.

In yet another example embodiment, the comparison of the destination base station devices at Step S507 may be performed alone and it may be determined that the distribution will then be delayed in a similar manner to the processing at Step S508 when the destinations of the preceding alert message overlap the destinations of the succeeding alert message at Step S507.

In yet another example embodiment, the comparison of the distribution times at Step S504 and the comparison of the importance at Step S506 may be performed alone and it may be determined that the distribution will then be delayed in a similar manner to the processing at Step S508 when the importance of the succeeding alert message is lower than the importance of the preceding alert message at Step S506.

In yet another example embodiment, the comparisons of the distribution times at Step S504 and the comparison of the destination base station devices at Step S507 may be performed alone and it may be determined that the distribution will then be delayed in a similar manner to the processing at Step S508 when the destinations of the preceding alert message overlap the destinations of the succeeding alert message at Step S507.

In yet another example embodiment, the two steps of comparison of the importance at Step S506 and of the destination base station devices at Step S507 may be performed alone and it may be determined that the distribution will then be delayed in a similar manner to the processing at Step S508 when the destinations of the preceding alert message overlap the destinations of the succeeding alert message at Step S507.

In yet another example embodiment, at least two of the three steps of comparison among the above-described Steps S504, S506, and S507 may be performed in a different sequence.

Figure 7:
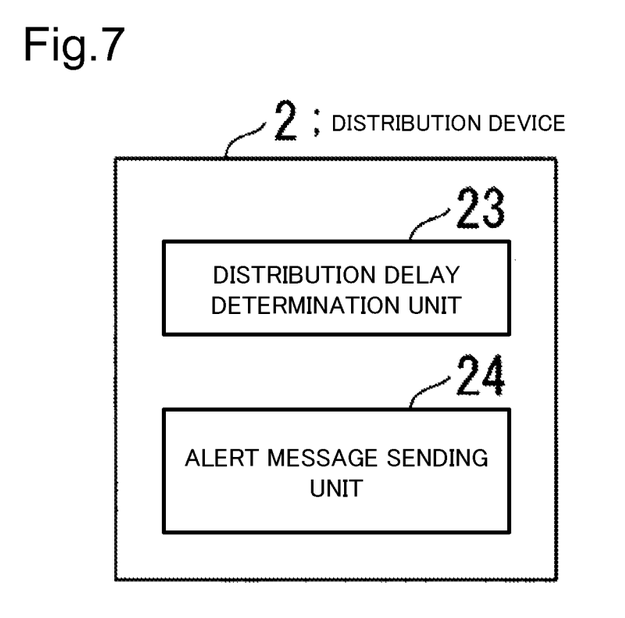
FIG. 7 is a diagram illustrating an example of a minimum configuration of the distribution device.

FIG. 7 is a diagram illustrating an example of a minimum configuration of the distribution device.

The distribution device 2 needs only to include the functions of the distribution delay determination unit 23 and the alert message sending unit 24.

The above-described devices each include a computer system inside. Programs that cause the devices to execute the above-described steps of processing are stored in respective machine-readable recording media of the devices and the computers of the devices read the programs and thereby execute the above-described processing. Here, the machine-readable recording media may be a magnetic disc, a magneto-optical disc, a compact disc (CD)-ROM, a digital versatile disc (DVD)-ROM, a semiconductor memory, and the like. Further, the computer programs may be distributed to the computers through communication lines and the computers, upon receiving the programs, may execute the programs.

Further, the programs may be programs that achieve a part of the functions of the above-described processing units. Further, the programs may be programs that achieve the above-described functions when combined with a program already stored in the computer system, or so-called differential files (differential programs).

Although the present invention has been described with reference to example embodiments, the present invention is not limited to the above-described example embodiments. Various modifications that a person skilled in the art can appreciate may be applied to the structure and details of the present invention within the scope of the present invention.

This application claims priority based on Japanese Patent Application No. 2017-087657, filed on Apr. 26, 2017, the disclosure of which is incorporated herein in its entirety by reference.

REFERENCE SIGNS LIST

1 Alert generation device
2 Distribution device
3 Base station control device
4 Base station device
5 Communication terminal
101 CPU
102 IF
103 Communication module
104 ROM
105 RAM
106 HDD
21 Receiving unit
22 Analysis unit
23 Distribution delay determination unit
24 Alert message sending unit

The invention claimed is:

1. An alert message distribution device comprising:
a processor configured to:
when distributing a new alert message, determine whether to delay distribution of the new alert message based on attributes of a previous alert message distributed in past; and
when it is determined that the distribution is delayed, distribute the new alert message to a base station device after waiting for a designated delay time, the base station device being a base station device to send the new alert message to a terminal device in place of the previous alert message for which a distribution request is made in past,
wherein the processor determines to delay the distribution when the base station device as a destination of the new alert message is same as the base station device as a destination of the previous alert message distributed in past, the destination is one of attributes of each of the new alert message and the previous alert message,
wherein, when a part of the base station devices as destinations of the new alert message overlaps a part of the base station devices as destinations of the previous alert message distributed in past, the processor reproduces the new alert message, delays distribution of the new alert message reproduced to the base station devices as overlapping destinations, and distributes the new alert message reproduced to the base station devices not as overlapping destinations without delaying the distribution, the destinations is one of attributes of each of the new alert message and the previous alert message.

2. The alert message distribution device according to claim 1, wherein the processor determines to delay the distribution when a distribution time of the new alert message is a time when a designated time period does not expire since a distribution time of the previous alert message distributed in past, the distribution time is one of the attributes of each of the new alert message and the previous alert message.

3. The alert message distribution device according to claim 1, wherein the processor determines to delay the distribution when an importance of the new alert message is lower than an importance of the previous alert message distributed in past, the importance is one of the attributes of each of the new alert message and the previous alert message.

4. An alert message distribution method comprising:
by a processor,
when distributing a new alert message, determining whether to delay distribution of the new alert message based on attributes of a previous alert message distributed in past; and
when determining that the distribution is delayed, distributing the new alert message to a base station device after waiting for a designated delay time, the base station device being a base station device to send the new alert message to a terminal device in place of the previous alert message for which a distribution request is made in past,
wherein, in determination of whether to delay distribution, determining to delay the distribution when the base station device as a destination of the new alert message is same as the base station device as a destination of the previous alert message distributed in past, the destination is one of attributes of each of the new alert message and the previous alert message,
wherein, in distribution of the new alert message, when a part of the base station devices as destinations of the new alert message overlaps a part of the base station devices as destinations of the previous alert message distributed in past, reproducing the new alert message, delaying distribution of the new alert message reproduced to the base station devices as overlapping destinations, and distributing the new alert message reproduced to the base station devices not as overlapping destinations without delaying the distribution, the destinations is one of attributes of each of the new alert message and the previous alert message.

5. A non-transitory computer-readable recording medium recording a program that causes a computer of an alert message distribution device to perform:
when distributing a new alert message, determining whether to delay distribution of the new alert message based on attributes of a previous alert message distributed in past; and
when determining that the distribution is delayed, distributing the new alert message to a base station device after waiting for a designated delay time, the base station device being a base station device to send the new alert message to a terminal device in place of the previous alert message for which a distribution request is made in past,
wherein, in determination of whether to delay distribution, determining to delay the distribution when the base station device as a destination of the new alert message is same as the base station device as a destination of the previous alert message distributed in past, the destination is one of attributes of each of the new alert message and the previous alert message,
wherein, in distribution of the new alert message, when a part of the base station devices as destinations of the new alert message overlaps a part of the base station devices as destinations of the previous alert message distributed in past, reproducing the new alert message, delaying distribution of the new alert message reproduced to the base station devices as overlapping destinations, and distributing the new alert message reproduced to the base station devices not as overlapping destinations without delaying the distribution, the destinations is one of attributes of each of the new alert message and the previous alert message.

* * * * *